United States Patent
Kumar et al.

(10) Patent No.: US 10,587,356 B2
(45) Date of Patent: Mar. 10, 2020

(54) SPECTRUM PARTITIONING USING HILBERT TRANSFORM FOR IMPROVED FREQUENCY SCAN

(71) Applicant: QUALCOMM Incorporated, San Diego, CA (US)

(72) Inventors: Ravinder Kumar, Rohtak (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 15/909,763

(22) Filed: Mar. 1, 2018

(65) Prior Publication Data
US 2019/0273530 A1   Sep. 5, 2019

(51) Int. Cl.
| | | |
|---|---|---|
| H04J 11/00 | (2006.01) |
| G06F 17/14 | (2006.01) |
| H04W 8/00 | (2009.01) |
| H04B 1/7083 | (2011.01) |
| H04L 27/26 | (2006.01) |
| H04L 5/00 | (2006.01) |

(52) U.S. Cl.
CPC .......... *H04J 11/0086* (2013.01); *G06F 17/14* (2013.01); *H04B 1/7083* (2013.01); *H04L 5/0048* (2013.01); *H04L 27/2639* (2013.01); *H04W 8/005* (2013.01)

(58) Field of Classification Search
CPC .... H04B 1/7083; G06F 17/14; H04J 11/0086; H04L 5/0048; H04L 27/2639; H04W 8/005
See application file for complete search history.

(56) References Cited

U.S. PATENT DOCUMENTS

| | | | |
|---|---|---|---|
| 7,483,444 B2 | 1/2009 | Raleigh et al. | |
| 7,613,104 B2 | 11/2009 | Bhatt et al. | |
| 7,684,512 B2 | 3/2010 | Nagaraj | |
| 8,300,713 B2 | 10/2012 | Hung et al. | |
| 9,961,655 B1* | 5/2018 | Sivaraman | ........ H04W 56/0015 |
| 2004/0122864 A1* | 6/2004 | Silagi | ................... H04N 21/235 |
| 2014/0198772 A1* | 7/2014 | Baldemair | .......... H04L 27/2655 |
| | | | 370/335 |
| 2015/0208253 A1* | 7/2015 | Kim | ..................... H04W 24/02 |
| | | | 370/252 |

FOREIGN PATENT DOCUMENTS

WO   WO-2017147439 A1   8/2017

* cited by examiner

*Primary Examiner* — Walter J Divito
(74) *Attorney, Agent, or Firm* — Norton Rose Fulbright LLP

(57) ABSTRACT

A method of performing wireless communication includes accumulating, by a user equipment (UE) during initial cell search, samples of received data over a maximum front-end bandwidth of the UE. The method also includes splitting the samples into smaller, non-overlapping spectrum chunks, and performing correlation-based detection on one or more of the smaller, non-overlapping chunks. The method further includes detecting a wireless communication system based on results of the correlation-based detection.

16 Claims, 17 Drawing Sheets

SPECTRUM PARTITIONING USING HILBERT TRANSFORM FOR IMPROVED FREQUENCY SCAN

TECHNICAL FIELD

Aspects of the present disclosure relate generally to wireless communication systems, and more particularly, to initial frequency scan by a user equipment. Certain embodiments of the technology discussed below can improve wireless system detection capability with reduced EARFCN uncertainty.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

A user equipment (UE) performs a frequency scan (FSCAN) when attempting initial acquisition. A power based FSCAN may be limited by signal to noise ratio (SNR). For example, the FSCAN may fail for SNR below −5 dB, and detection performance is poor even at 0 dB, which makes the power based FSCAN unsuitable for UE mode B. In poor coverage, a UE in mode B searches for each EARFCN to detect primary and secondary synchronization signals (PSS/SSS), which is highly time consuming and computationally complex. Cyclic prefix (CP) correlation may be used to enhance the FSCAN, but CP correlation based FSCAN suffers from two major drawbacks. Firstly, the performance is sensitive toward the fraction of LTE bandwidth captured and the bandwidth of the target LTE system. Secondly, the number of potential EARFCNs to search post CP correlation is high.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of performing wireless communication includes accumulating, by a user equipment (UE) during initial cell search, samples of received data over a maximum front-end bandwidth of the UE. The method also includes splitting the samples into smaller, non-overlapping spectrum chunks, and performing correlation-based detection on one or more of the smaller, non-overlapping chunks. The method further includes detecting a wireless communication system based on results of the correlation-based detection.

In an additional aspect of the disclosure, a wireless communications apparatus includes a computer processor and a memory coupled to the computer processor. The computer processor is configured to accumulate, by a user equipment (UE) during initial cell search, samples of received data over a maximum front-end bandwidth of the UE. The computer processor is additionally configured to split the samples into smaller, non-overlapping spectrum chunks. The computer processor is also configured to perform correlation-based detection on one or more of the smaller, non-overlapping chunks. The computer processor is further configured to detect a wireless communication system based on results of the correlation-based detection.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 1 is a block diagram illustrating details of a wireless communication system according to some embodiments of the present disclosure.

DETAILED DESCRIPTION

Figure 1:
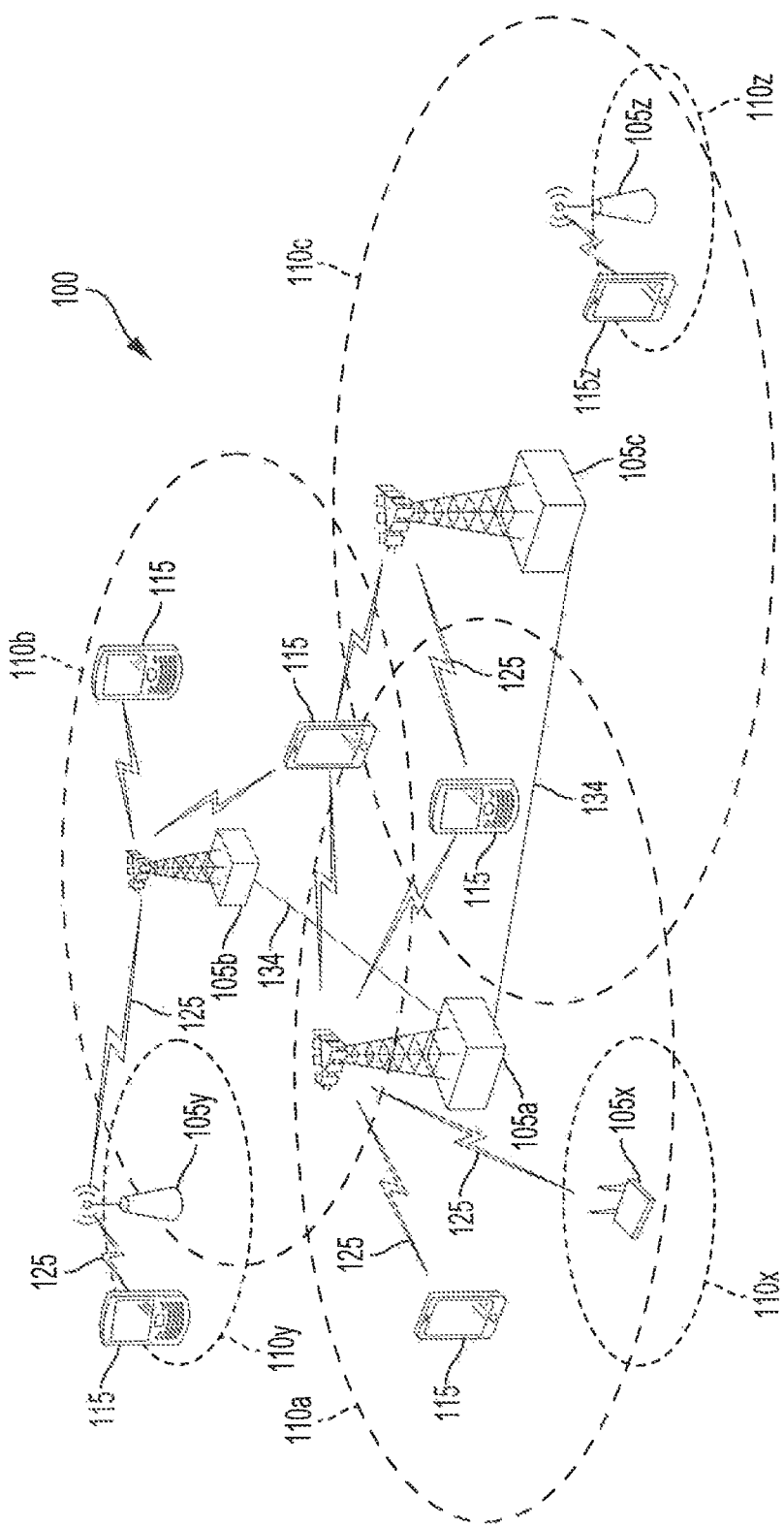

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
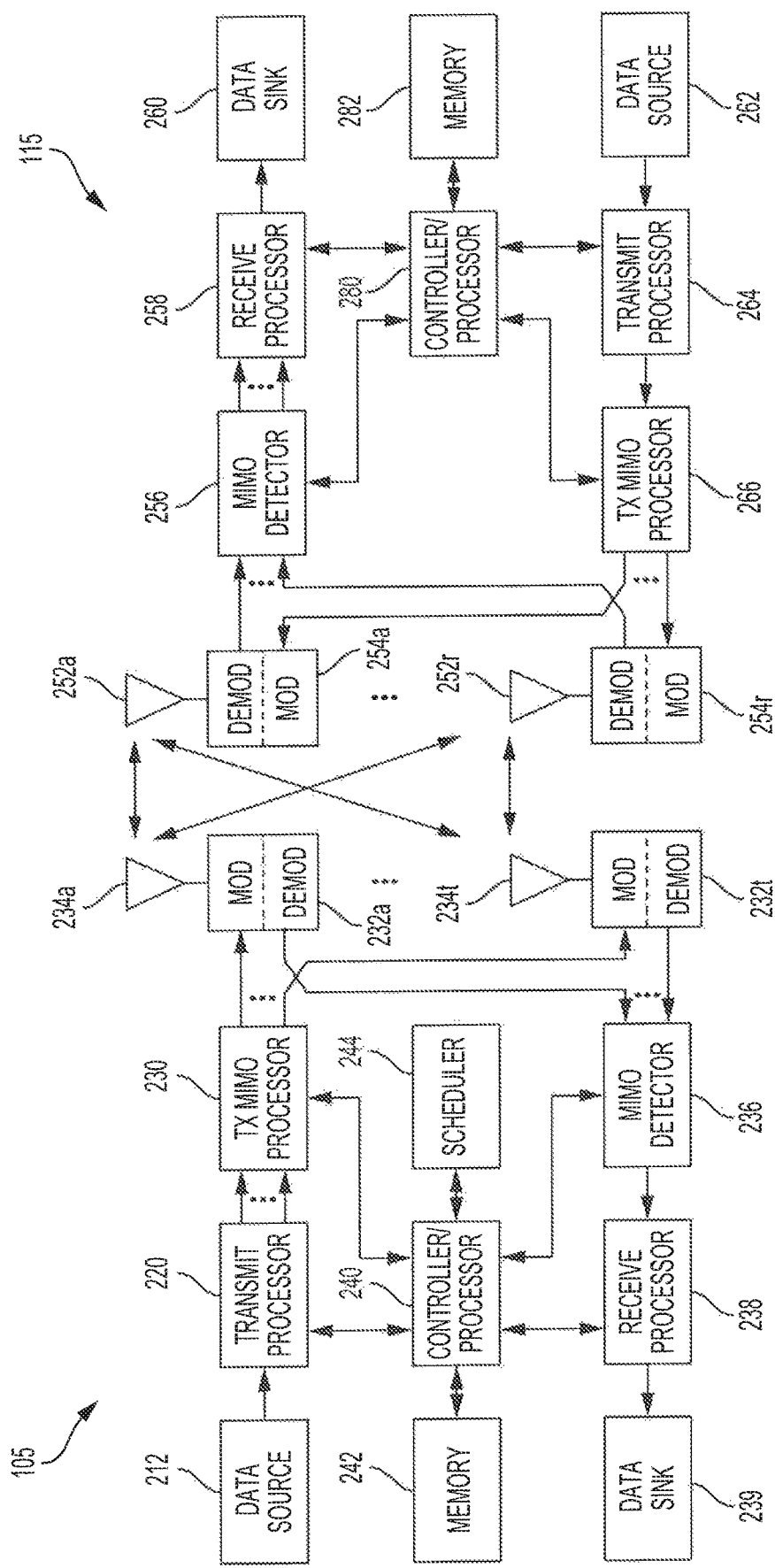
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 10-19, and/or other processes for the techniques described herein. Memories 242 and 282 may store data and program codes for gNB 105 and UE 115, respectively. Scheduler 244 may schedule UEs for data transmission on the downlink and/or uplink.

FIGS. 3-10 provide details relating to challenges arising with respect to initial frequency scan by a UE, such as UE 115. A UE performs a frequency scan (FSCAN) when attempting initial acquisition of a wireless communication system. A power based FSCAN may be limited by signal to noise ratio (SNR). For example, the FSCAN may fail for SNR below −5 dB, and detection performance is poor even at 0 dB, which makes the power based FSCAN unsuitable for UE mode B. In poor coverage, a UE in mode B searches for each EARFCN to detect primary and secondary synchronization signals (PSS/SSS), which is highly time consuming and computationally complex. Cyclic prefix (CP) correlation may be used to enhance the FSCAN, but CP correlation based FSCAN suffers from two major drawbacks. Firstly, the performance is sensitive toward the fraction of LTE bandwidth captured and the bandwidth of the target LTE system. Secondly, the number of potential EARFCNs to search post CP correlation is high.

Figure 3:
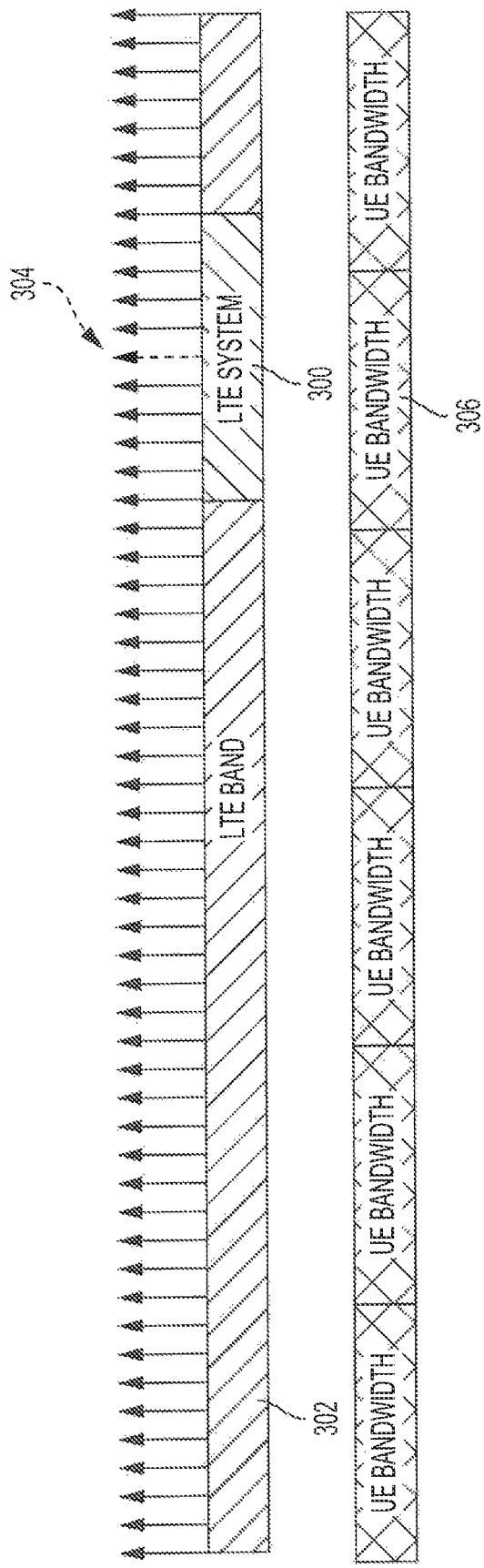
FIG. 3 is a block diagram illustrating UE frequency scan (FSCAN) of a long term evolution (LTE) band according to some embodiments of the present disclosure.

Referring to FIG. 3, a wireless communication system, such as LTE system 300, occupies a portion of a frequency band, such as LTE band 302. A true EARFCN 304 may correspond, for example, to a center frequency of the LTE system 300. The goal of the FSCAN is to find the true EARFCN 304 in a minimum possible time. To do so, the UE scans the LTE band 302 by dividing the LTE band into a minimum number of possible subbands. The UE bandwidth 306 is typically set to a maximum supported bandwidth of a wireless modem of the UE. For example, the maximum supported bandwidth may be 20 MHz for some UE modems. Alternatively, for other modems designed for Internet of Things (IoT) applications, the maximum supported bandwidth nay be 5 MHz, which would require the UE to scan the LTE band 302 using a 5 MHz bandwidth.

Figure 4:
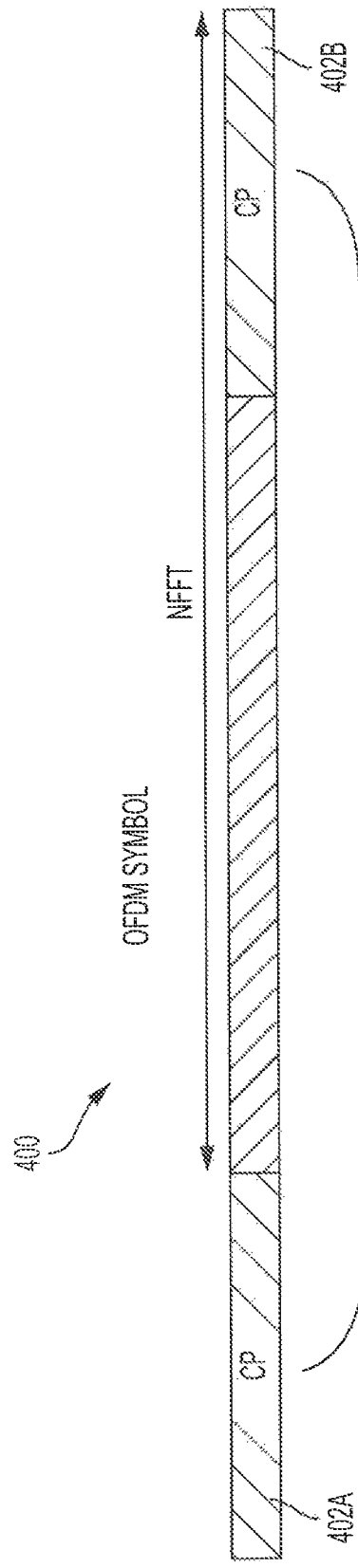
FIG. 4 is a block diagram illustrating cyclic prefix (CP) correlation-based scan according to some embodiments of the present disclosure.
Figure 5:
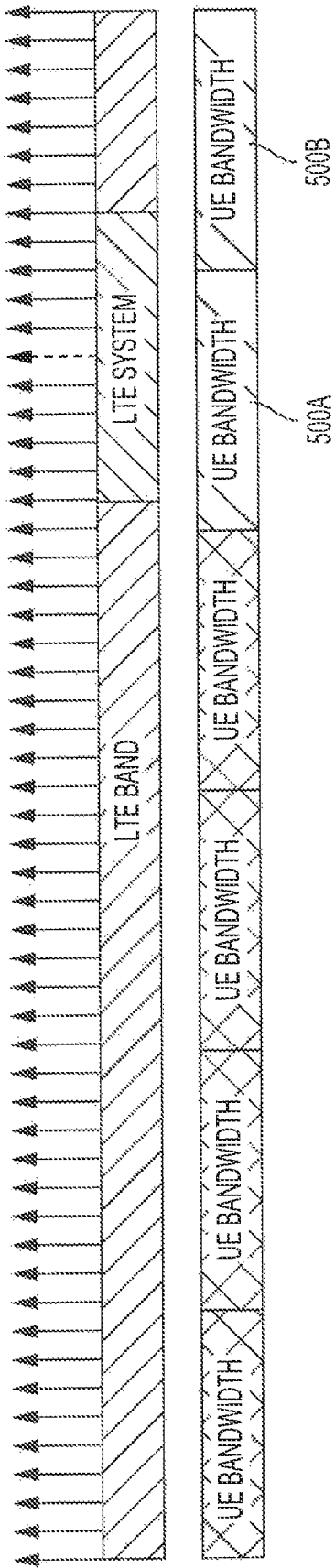
FIG. 5 is a block diagram illustrating identification of EARFCN candidates as a result of the CP correlation-based scan according to some embodiments of the present disclosure.

Referring to FIG. 4, CP correlation-based FSCAN is a new application for CP correlation. LTE signals are composed of OFDM symbols 400 bounded by cyclic prefixes 402A and 402B. The CP correlation-based FSCAN technique exploits this inherent correlation existing in LTE signals and performs auto correlation on each UE bandwidth amount of accumulated samples to detect CP correlation. If CP correlation is not detected, then there is no need to search for EARFCNs in the current portion of the band, which ultimately saves time. As shown in FIG. 5, this approach may narrow the potential EARFCN candidates to a few UE bandwidths 500A and 500B.

Figure 6:
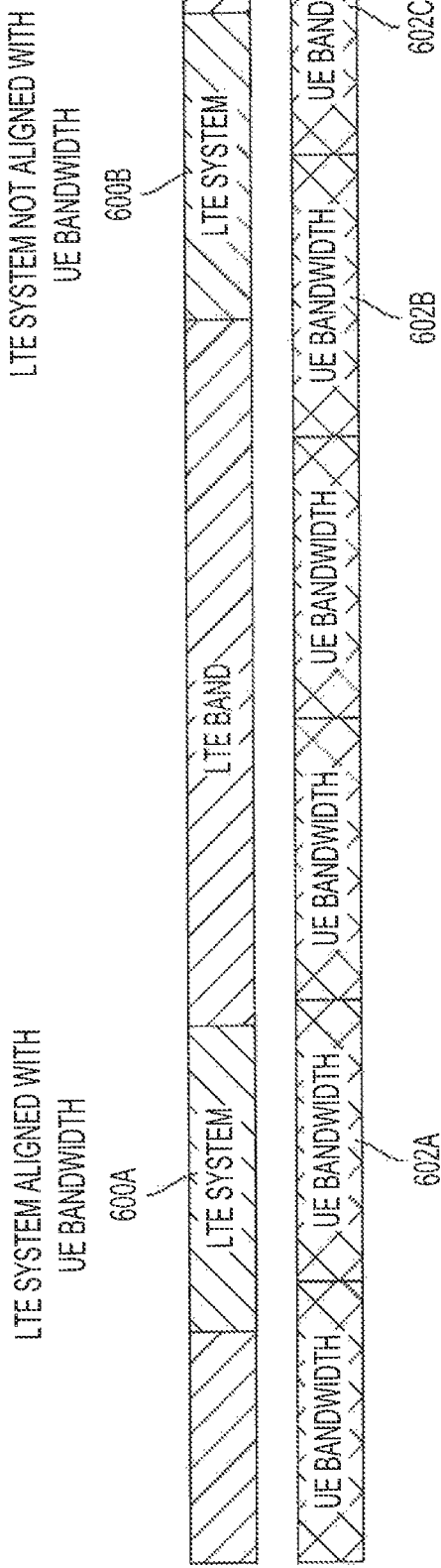
FIG. 6 is a block diagram illustrating issues regarding alignment of the LTE system bandwidth with the UE bandwidth according to some embodiments of the present disclosure.
Figure 7:
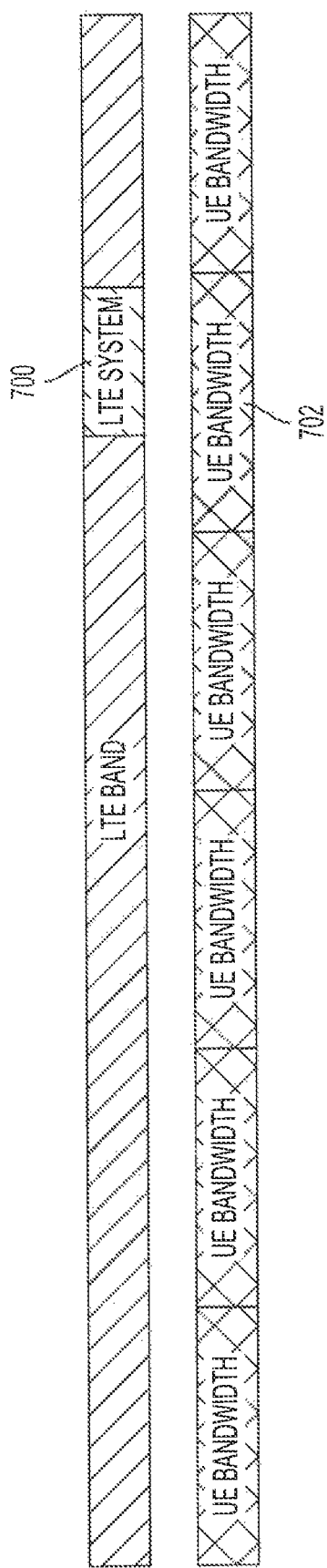
FIG. 7 is a block diagram illustrating issues regarding difference in size between the LTE system bandwidth and the UE bandwidth according to some embodiments of the present disclosure.

Referring to FIG. 6, issues may arise regarding alignment of the LTE system bandwidth with the UE bandwidth. This drawback of the CP correlation-based FSCAN stems from sensitivity towards the fraction of the LTE system captured and the bandwidth of the deployed LTE system. In particular, detectability of the LTE system is reduced whenever there is a reduction in the captured portion of the LTE system. For example, when the LTE system 600A is aligned with the UE bandwidth 602A, most or all of the LTE system 600A is captured within the samples accumulated over the UE bandwidth 602A However, when the LTE system 600B is not aligned with either UE bandwidth 602B or 602C, then only a fraction of the LTE system 600B is captured in each UE bandwidth 602B and 602C. As a result, accumulated samples corresponding to each of UE bandwidths 602B and 602C exhibit reduction in captured correlation energy and unwanted interference from the samples for which there is no LTE system. As shown in FIG. 7, similar issues exist when the LTE system bandwidth 700 is significantly smaller than the UE bandwidth 702.

Figure 8:
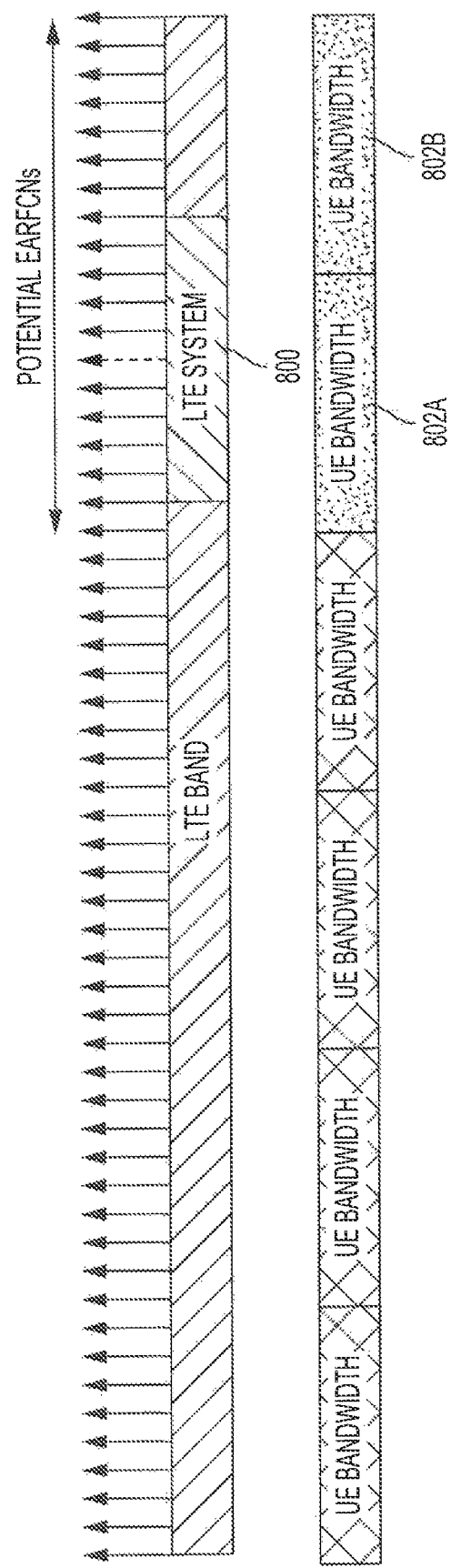
FIG. 8 is a block diagram illustrating issues regarding EARFCN uncertainty according to some embodiments of the present disclosure.

Turning now to FIG. 8, additional drawbacks of CP correlation-based FSCAN stem from issues regarding EARFCN uncertainty. For example, even though CP correlation-based FSCAN provides a gain by eliminating a significant portion of the LTE band where there is no LTE system, there still exists a significant degree of EARFCN uncertainty. In the example of misalignment of the LTE system 800 with UE bandwidths 802A and 802B, the true EARFCN can be anywhere within the UE bandwidths 802A and 802B. For 5 MHz, 10 MHz, and 20 MHz UE bandwidths, there are 45, 90, and 180 EARFCNs per UE bandwidth, respectively. The computation time required to scan all of these EARFCNs to locate the true EARFCN is prohibitively large. Moreover, the EARFCN uncertainty further increases with false alarms, which are to be expected in low SNR conditions.

Figure 9:
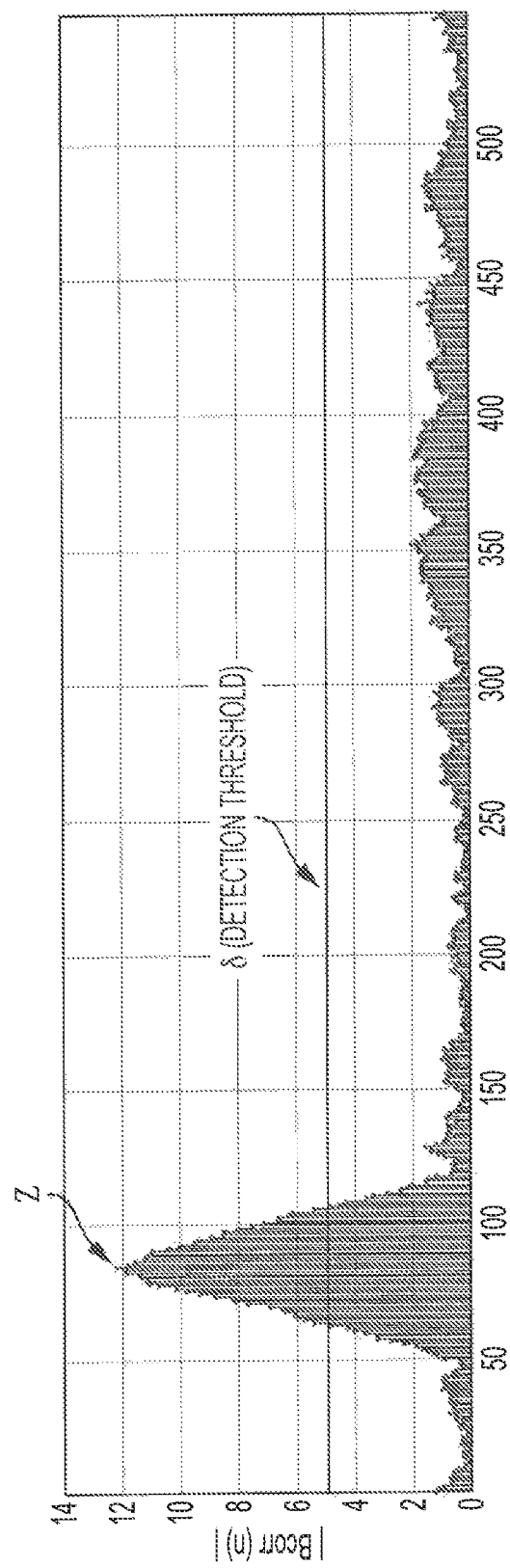
FIG. 9 is a graphical representation of CP correlation-based peak detection according to some embodiments of the present disclosure.

Referring to FIG. 9, the CP correlation-based peak detection may be carried out using a CP accumulations buffer Bcorr(n) to accumulate CP correlation values through auto-correlation and coherently combine the correlation values for a specified duration (T). For example, for a UE bandwidth of 5 MHz, the buffer Bcorr(n) may be defined for n=0, 1, . . . , 548. A performance metric z=max |Bcorr(n)|∀n, and a decision may be made according to:

$$1, z \geq \delta$$
$$0, z < \delta$$

where δ is a detection threshold. This CP correlation-based technique promises to detect LTE signal up to −15 dB, and correlation gain can be increased by increasing the capture time (T).

Figure 10:
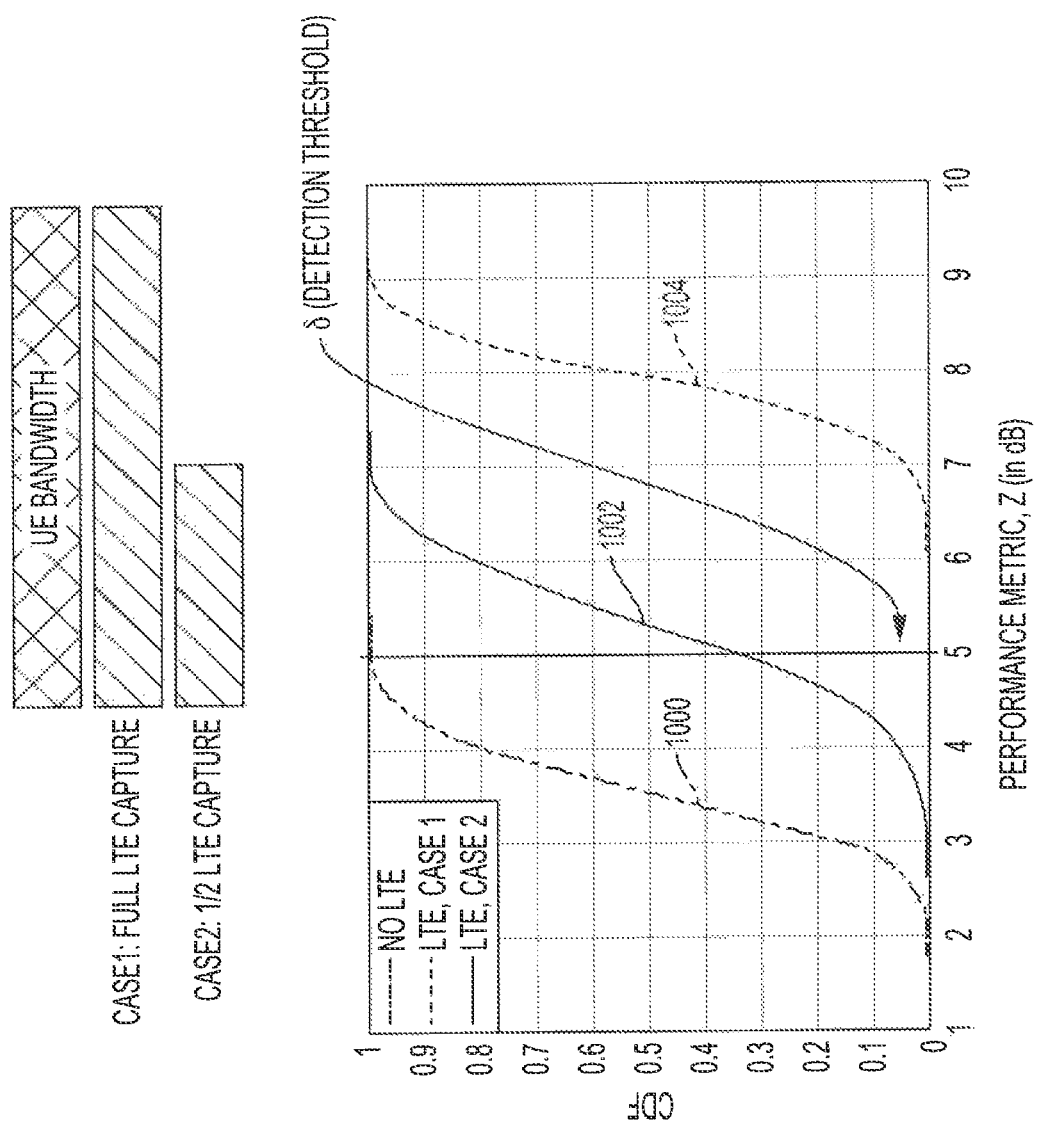
FIG. 10 is a graphical representation of a cumulative distribution function (CDF) demonstrating effects of partial LTE capture according to some embodiments of the present disclosure.

Turning to FIG. 10, cumulative distribution functions (CDFs) demonstrate effects of partial LTE capture. The CDFs are plotted along the ordinate axis, and the performance matric z is plotted along the abscissa. For proper detection, the detection threshold δ must be able to separate the CDFs for LTE and non LTE cases. Two cases are considered and compared to a CDF 1000 for no LTE. Case 1 considers the case in which the full LTE system is captured in the UE bandwidth, whereas only half of the LTE system is captured in case 2. The CDF 1004 for case 1 is clearly distinguishable from the CDF 1000 for no LTE, whereas the CDF 1002 for case 2 exhibits significant overlap with the CDF 1000 for no LTE. As previously mentioned, one way to enhance the detection is to increase the capture time, but such an increase results in a penalty of additional time for accumulating the extra samples. As also previously mentioned, even if the LTE system is detected, false EARFCNs corresponding to the vacant portion of the bandwidth still need to be post-processed, which again comes at the expense of additional time and computations.

FIGS. 11-20 provide details relating to proposed solutions that improve detection and/or decrease EARFCN uncertainty without incurring the aforementioned penalties resulting from increasing the capture time and/or post-processing to rule out excessive false EARFCNs. The solutions set forth below are principally described with respect to a UE bandwidth of 5 MHz and use of CP correlation-based detection. However, it is envisioned that other UE bandwidths and/or other correlation-based detection techniques may be employed. For example, another potential correlator is based on CRS auto-correlation. However, a CRS based correlator is sensitive towards frequency offset (FO) errors and high doppler fading. In contrast, a CP based correlator is robust to both FO and high Doppler, and thus, is a presently preferred.

The solutions disclosed herein implement band partitioning to address the problems of CP correlation-based FSCAN. The solution is effective in increasing detection probability and narrowing down the potential EARFCNs to a small number. The basic solution involves dividing spectrum into smaller chunks (or sub-bands) by accumulating the samples over maximum UE bandwidth and splitting the samples having smaller non-overlapping bandwidths to make refined decision on smaller spectrum chunks. This splitting avoids separate accumulation of samples for smaller spectrum chunks.

In some embodiments detailed below with respect to FIGS. 11-16, the spectrum partitioning is performed by subdividing the spectrum in binary tree fashion to a number of levels selected to ensure that all smallest spectrum chunks at a lowest level of the tree have bandwidths that are equivalent to a minimum supported bandwidth. At each level, the bandwidth is divided into two halves (positive and negative half) using a Hilbert transform. For each half, down sampling and rotation are performed, and CP-correlation based decisions are made at each level for achieving maximum performance benefits.

In other embodiments detailed below with respect to FIG. 17, the samples are split into chunks in response to inability to make a strong decision about detection of a wireless signal in the samples, and further splitting of any chunks is also performed in response to determining an inability to make a strong decision about detection of a wireless signal in the chunks. The inability to make a strong decision about detection of the wireless signal is determined if z is less than a detection threshold δ, wherein z is a performance metric equal to max |Bcorr(n)|∀n for a CP accumulations buffer Bcorr(n).

In other embodiments detailed below with respect to FIG. 18, samples are split to exactly localize a wireless system of a wireless signal in response to detection of the wireless signal in the samples. Further splitting of any chunks is also performed in response to detection of the wireless signal in the chunks. The presence of the wireless signal is determined if z is greater than a detection threshold δ, wherein z is a performance metric equal to max |Bcorr(n)|∀n for a CP accumulations buffer Bcorr(n).

Figure 11:
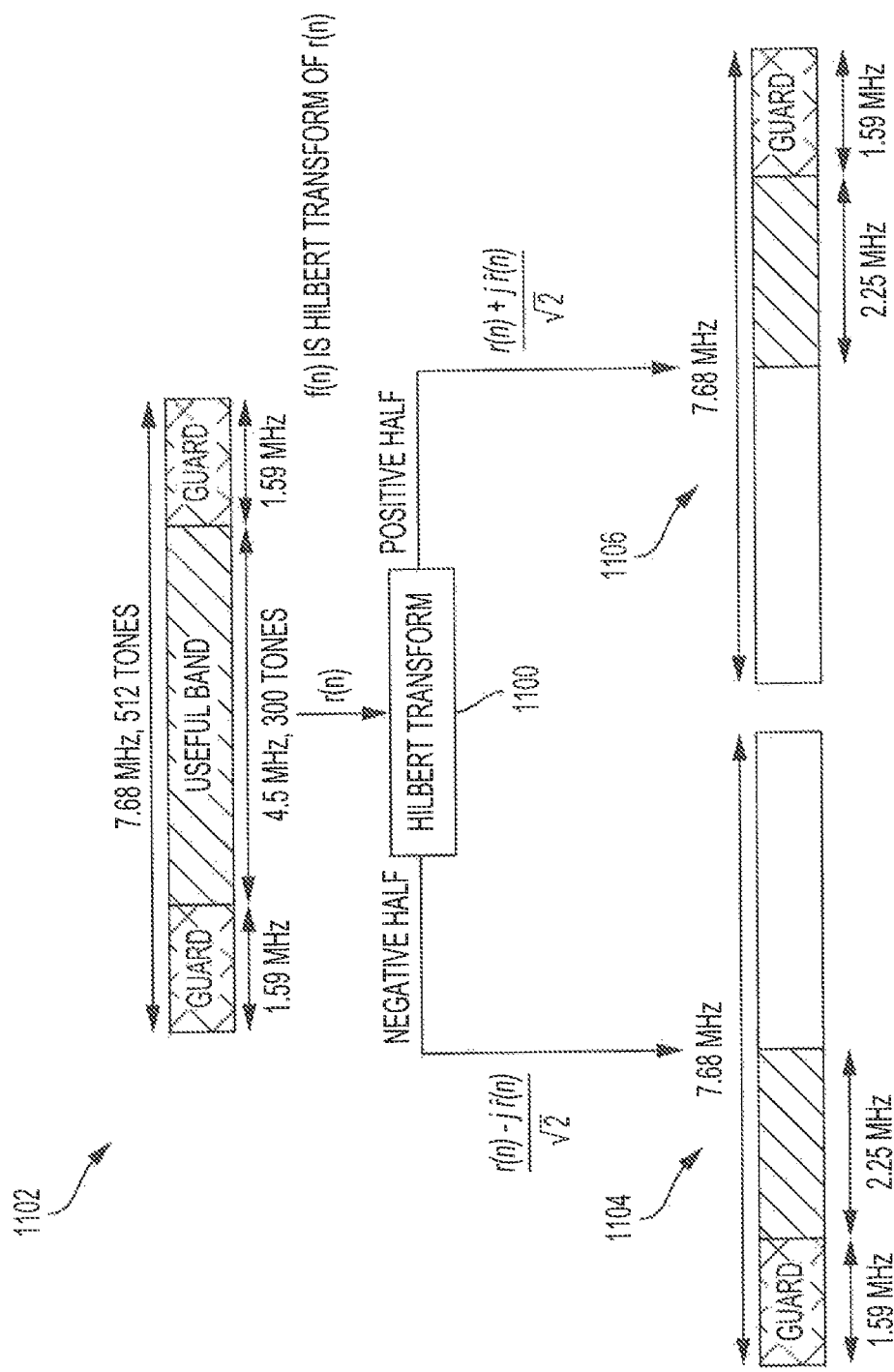
FIG. 11 is a block diagram illustrating use of a Hilbert transform to perform spectrum partitioning by splitting UE bandwidth samples into two equal halves according to some embodiments of the present disclosure.

Referring to FIG. 11, a Hilbert transform 1100 is used to perform spectrum partitioning by splitting 5 MHz UE bandwidth samples 1102 into two equal halves 1104 and 1106. In this example for other modems, the UE is configured with 5 MHz front end bandwidth at a sampling rate of 7.68 MHz and a fast Fourier transform size NFFT of 512. As mentioned above, it is envisioned that other UE front end bandwidths may be used.

Figure 12:
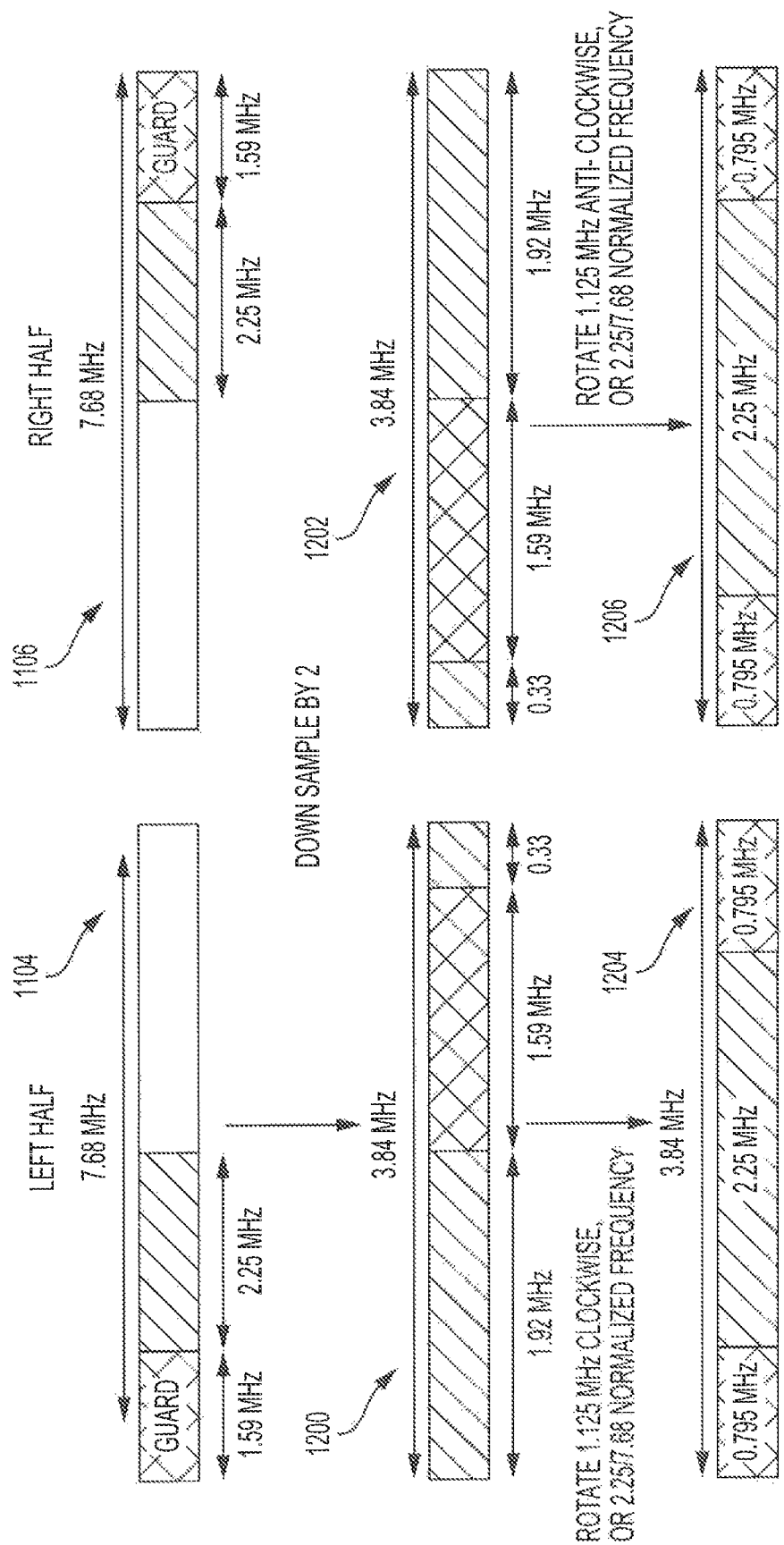
FIG. 12 is a block diagram illustrating processing of the two equal halves by down sampling and rotation according to some embodiments of the present disclosure.

Referring to FIG. 12, each of the two equal halves 1104 and 1106 may be processed by down sampling to arrive at down sampled halves 1200 and 1202, and these down sampled halves 1200 and 1202 may be rotated to arrive at down sampled and rotated halves 1204 and 1206. For example, the two halves 1104 and 1106 may be down sampled by two, so that the sample rates of the down sampled signals match with a UE bandwidth of 3 MHz. Additionally, the down sampled half 1200 may be rotated 1.125 MHZ clockwise, or 2.25/7.68 normalize frequency. Also, the down sampled half 1202 may be rotated 1.125 MHz anti-clockwise, or 2.25/7.68 normalized frequency. This processing makes the down sampled and rotated halves 1204 and 1206 suitable for further processing by CP correlation-based detection.

Figure 13:
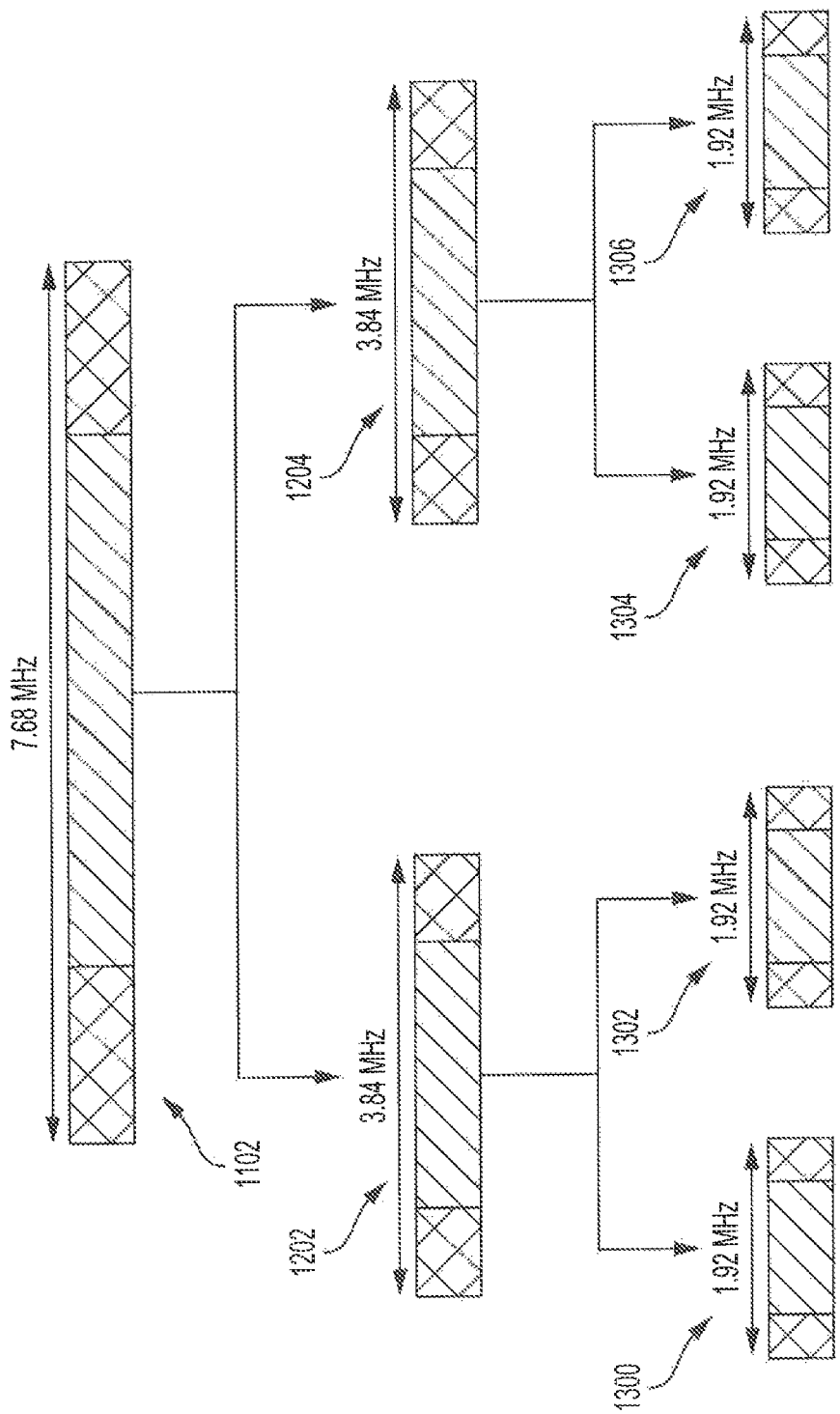
FIG. 13 is a block diagram illustrating splitting of UE 5 MHz bandwidth spectrum in a binary tree fashion according to some embodiments of the present disclosure.

Referring to FIG. 13, the splitting and processing of the UE bandwidth samples 1102 and down sampled and rotated halves 1204 and 1206 may continue to be performed in a binary tree fashion to arrive at a tree having a number of levels, where leaves 1300, 1302, 1304, and 1306 at the lowest level of the tree cannot be further split without producing halves having bandwidths that fall below a minimum supported bandwidth. For UE bandwidth of 5 MHz, it is sufficient to perform splitting up to three levels because the bandwidth of the smallest spectrum chunks is equivalent to the minimum supported LTE bandwidth of 1.4 MHz. For a UE having a front end bandwidth of 20 MHz, the splitting may be performed up to five levels. Hence, this approach enables reliable detection for target LTE systems deployed with any supported bandwidth.

Figure 14:
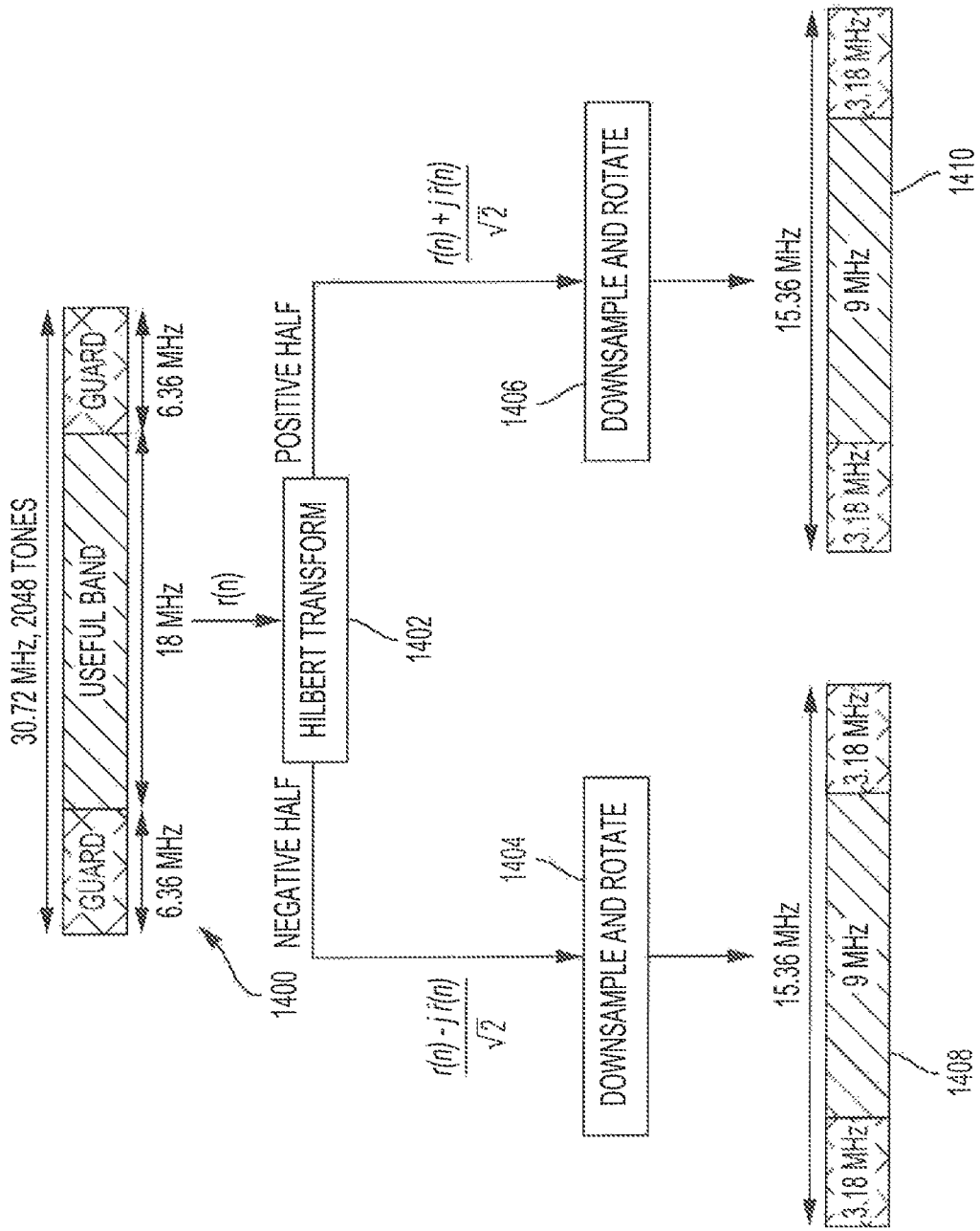
FIG. 14 is a block diagram illustrating splitting of UE 20 MHz bandwidth spectrum in a binary tree fashion according to some embodiments of the present disclosure.

Referring to FIG. 14, splitting of UE 20 MHz bandwidth spectrum samples 1400 may be performed in the binary tree fashion using the Hilbert transform 1402, down sampling and rotation processing 1404 and 1406 between each level to arrive at down sampled and rotated halves 1408 and 1410. In this example, the UE is configured with a front end bandwidth of 20 MHz, a sampling rate of 30.72 MHz, and a fast fourier transform size NFFT of 2048. In this case, splitting may be performed up to level five to arrive at leaves of the tree with spectrum chunks having bandwidths that are equivalent to the minimum supported LTE bandwidth of 1.4 MHz.

Figure 15:
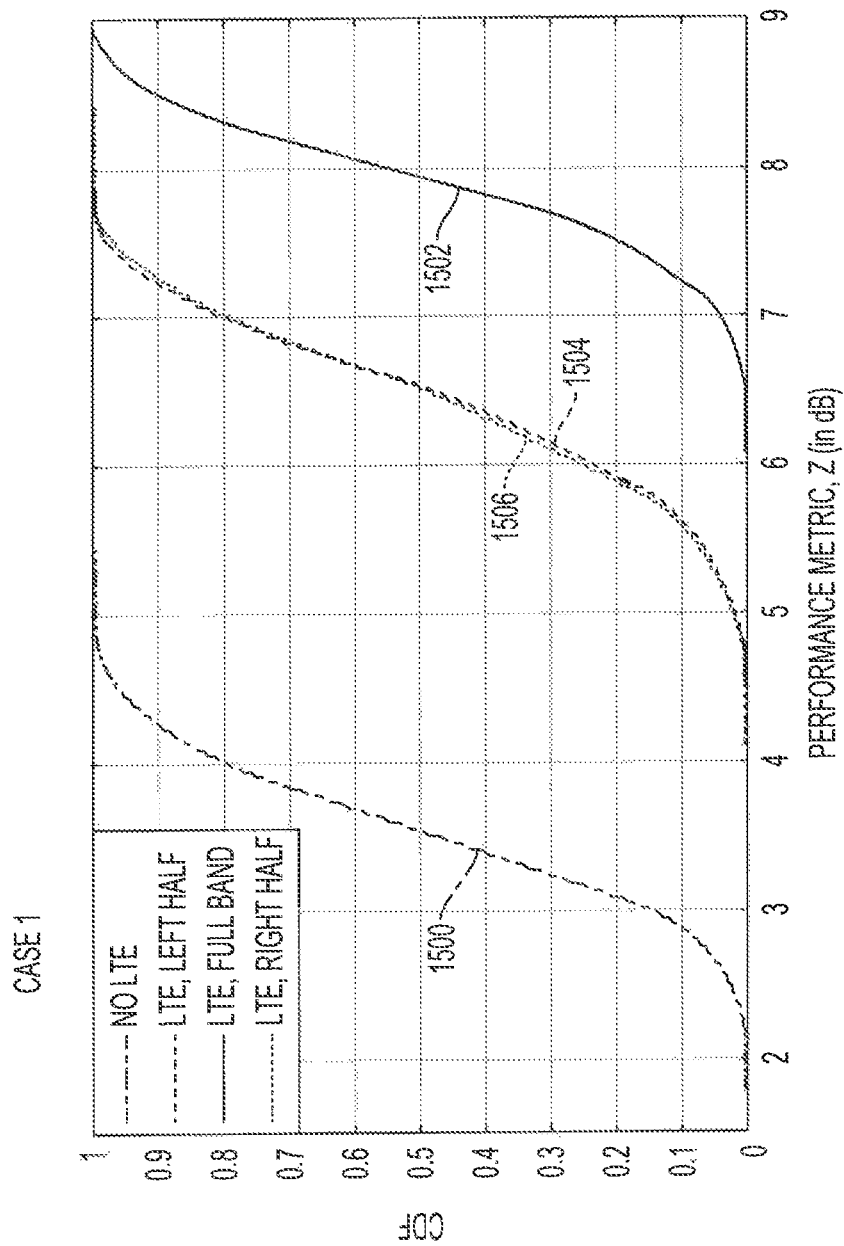
FIG. 15 is a graphical representation of a CDF demonstrating degradation in performance due to band splitting according to some embodiments of the present disclosure.

Turning to FIG. 15, four CDFs demonstrate the potential for degradation in performance due to band splitting. The CDFs are plotted along the ordinate axis, and the performance matric z is plotted along the abscissa. For proper detection, the detection threshold δ must be able to separate the CDFs for LTE and non LTE cases. A CDF 1500 for no LTE is plotted alongside a CDF 1502 for the full band, and CDFs 1504 and 1506 for the left and right halves at level two. The CDF 1502 for the full band is clearly distinguishable from the CDF 1500 for no LTE, whereas the CDFs 1504 and 1506 for the left and right halves are degraded when compared to the CDF 1502 for the full band. This degradation is due to division of the correlation energy between the two halves. Accordingly, it is presently preferred to perform CP correlation based detection at each band or band portion at each level.

Figure 16:
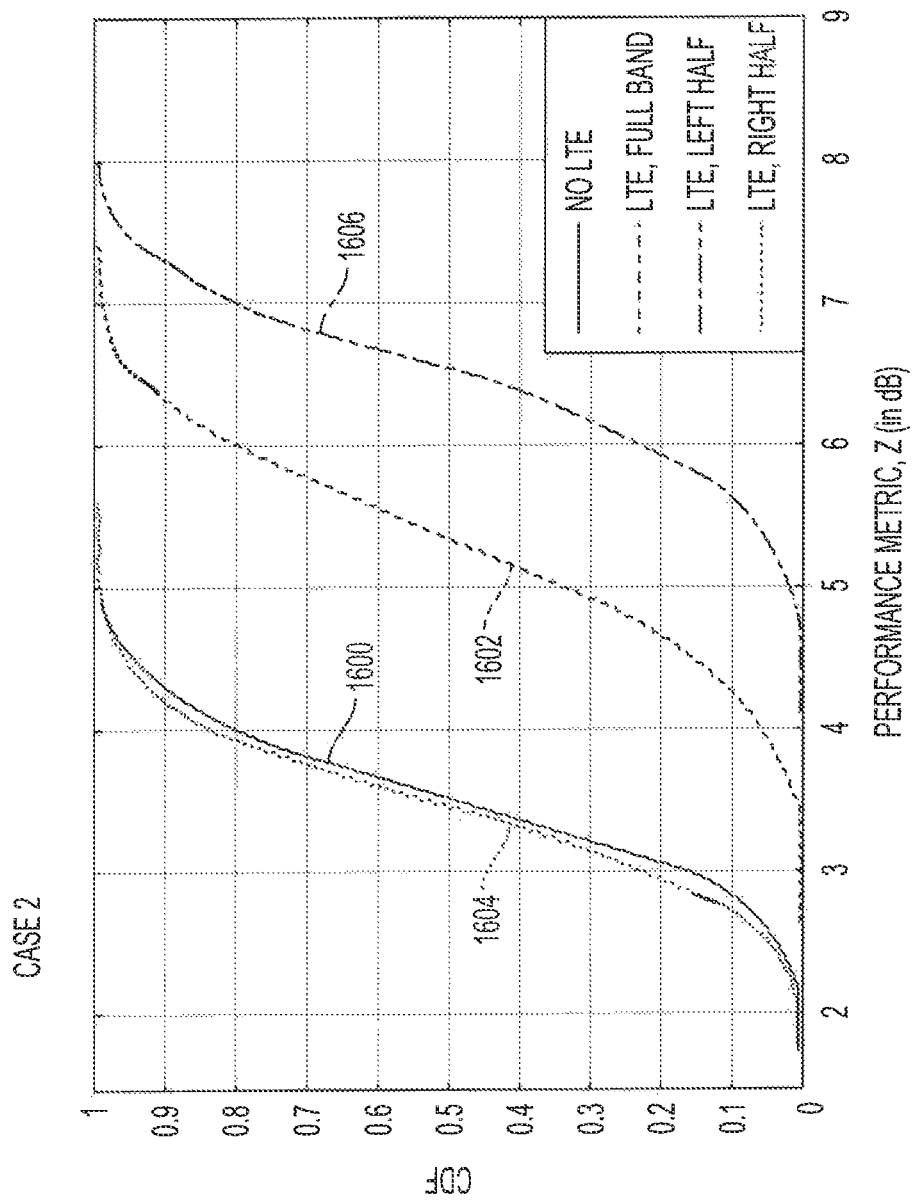
FIG. 16 is a graphical representation of a CDF demonstrating improvement in detectability of the wireless system in the left half of the band due to band splitting according to some embodiments of the present disclosure.

Turning to FIG. 16, four CDFs demonstrate the potential for enhancement in performance due to band splitting. The CDFs are plotted along the ordinate axis, and the performance matric z is plotted along the abscissa. For proper detection, the detection threshold δ must be able to separate the CDFs for LTE and non LTE cases. A CDF 1600 for no LTE is plotted alongside a CDF 1602 for the full band, a CDF 1604 for the right half of the band at level two, and a CDF 1606 for the left half of the band at level two. The CDF 1602 for the full band exhibits significant overlap with the CDF 1600 for no LTE, whereas detectability is improved in the left half of the band. In comparison to the CDF 1600 for the full band, the CDF 1606 for the left half of the band is sufficiently separable from the CDF 1600 for no LTE. Hence, there is improved detection probability in the left half of the band due to splitting. In contrast, the CDF 1604 for the right half of the band completely merges with the CDF 1600 for no LTE, thus ultimately identifying the vacant portion of the spectrum and reducing EARFCN uncertainty.

As detailed above with respect to FIGS. 11-16, the proposed binary tree approach is helpful for two aspects of FSCAN. For example, the detection probability is improved. In particular, the spectrum splitting can enhance detection probability when the target LTE system bandwidth is small than the UE front end bandwidth which is configured at the maximum supported bandwidth of the modem of the UE. Detection enhancement also occurs when the UE captures only a fraction of the LTE system. In addition to enhancing detection probability, the spectrum splitting can result in reduced EARFCN uncertainty. In particular, the band splitting can further narrow down the EARFCN search space by effectively rejecting vacant portions of the band. As noted above, due to the potential for degradation due to division of correlation energy between spectrum chunks, it is recommended to perform CP correlation-based detection at each level. However, doing so increases computational complexity. Therefore, in order to reduce complexity, some additional approaches are described below with respect to FIGS. 17 and 18. These approaches may be used selectively, depending on UE requirements, either to enhance detection or reduce EARFCN uncertainty.

Figure 17:
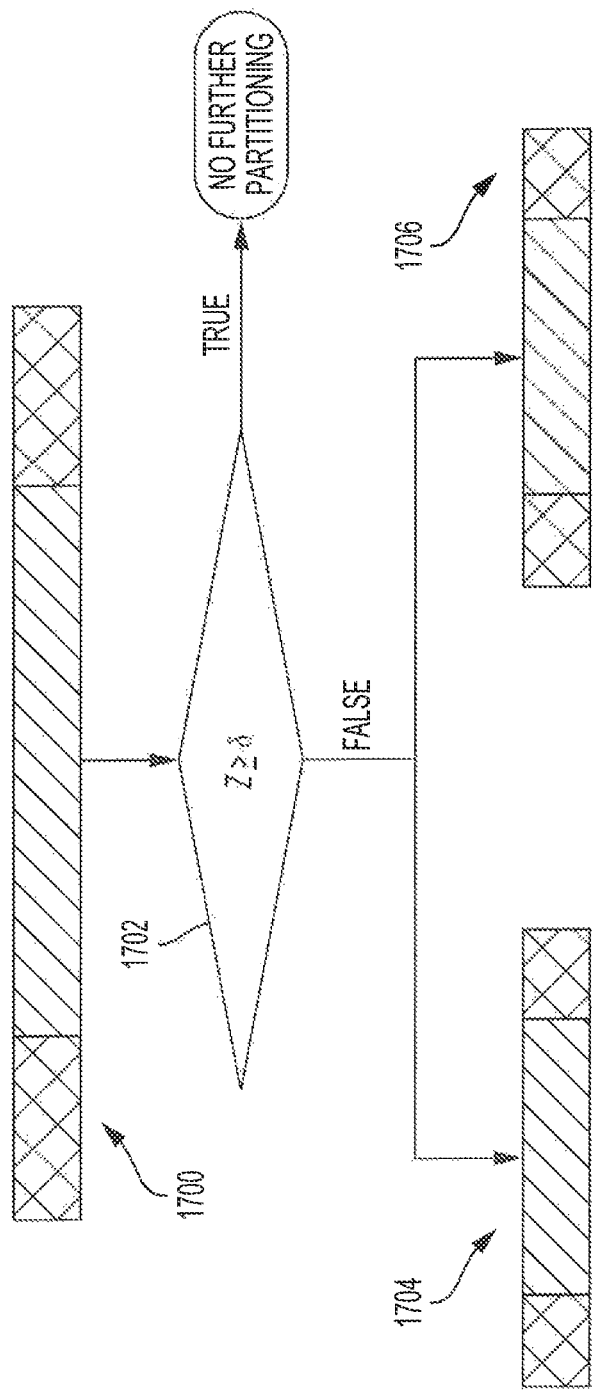
FIG. 17 is a block diagram illustrating example blocks of a band splitting process to enhance detection according to some embodiments of the present disclosure.

Referring to FIG. 17 a band splitting process may be employed to enhance detection only when a strong decision cannot be made about the presence of the LTE signal in the respective band portion 1700 under consideration. For example, band portion 1700 may be the full UE front end bandwidth or a down sampled and rotated chunk thereof. CP correlation-based detection may be performed on the band portion 1700, and a determination made, at block 1702, whether a strong peak is detected based on whether the resulting performance metric z is greater than or equal to detection threshold δ. If a strong peak is detected at block 1702, then no further partitioning needs to be performed for that band portion 1700. However, if a strong peak is not detected at block 1702, then the band portion 1700 may be split and the halves down sampled and rotated to produce further band portions 1704 and 1706. These further band portions 1704 and 1706 may then be evaluated by CP correlation-based detection and, if they are still large enough to be subjected to splitting without producing chunks that are too small in size, they can subjected to the same selective band splitting process as band portion 1700. Accordingly, the band splitting may be selectively performed for conditions of a narrow LTE system or partial LTE capture, thus providing gains in such scenarios, especially in low SNR conditions. This approach targets improvement in detection probability, which is highly desirable in low SNR conditions.

Figure 18:
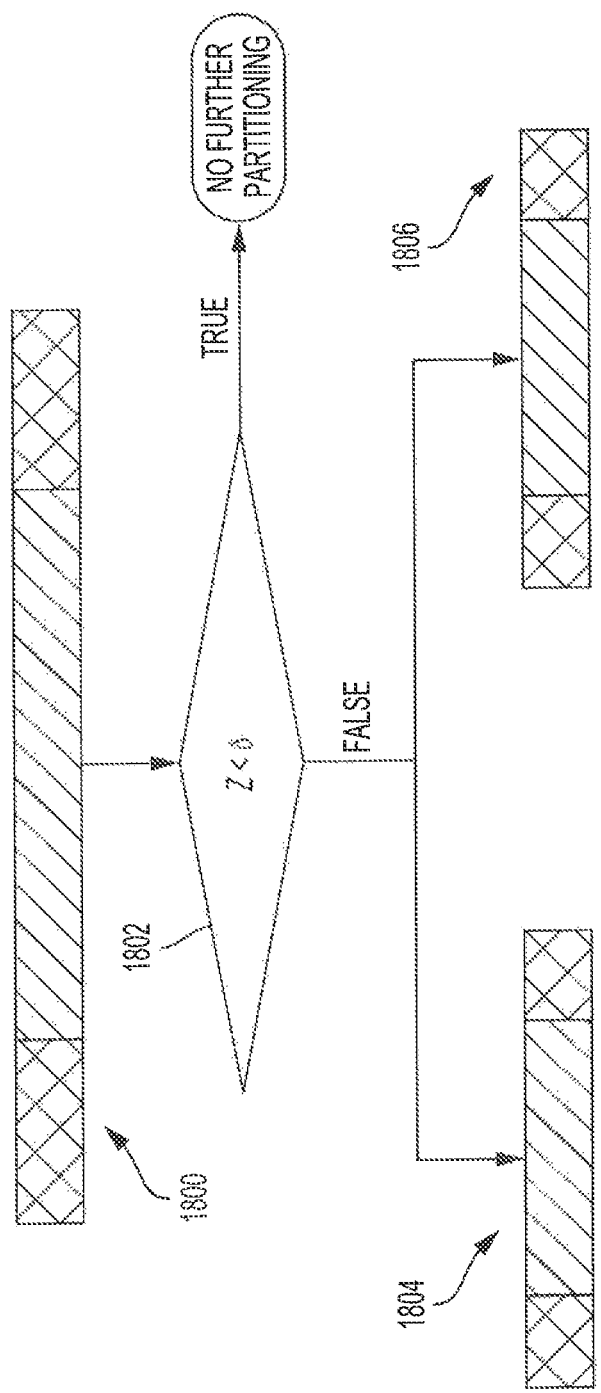
FIG. 18 is a block diagram illustrating example blocks of a band splitting process to reduce EARFCN uncertainty according to some embodiments of the present disclosure.

Referring to FIG. 18, a band splitting process may be employed to reduce EARFCN uncertainty, which may be helpful in relatively high SNR scenarios in which a fractional LTE signal is also detectable. In this approach, band splitting may be performed only when a strong decision can be made about the presence of the LTE signal in the respective band portion 1700 under consideration. For example, band portion 1800 may be the full UE front end bandwidth or a down sampled and rotated chunk thereof. CP correlation-based detection may be performed on the band portion 1800, and a determination made, at block 102, whether a strong peak is not detected based on whether the resulting performance metric z is less than detection threshold δ. If a strong peak is not detected, then no further partitioning is performed for the band portion 1800 under evaluation. However, if a strong peak is detected at block 1802, then the band portion 1800 may be split and the halves down sampled and rotated to produce further band portions 1804 and 1806. These further band portions 1804 and 1806 may then be evaluated by CP correlation-based detection and, if they are still large enough to be subjected to splitting without producing chunks that are too small in size, they can be subjected to the same selective band splitting process as band portion 1800. In this manner, the band splitting is performed to precisely localize the LTE system, and thus, narrow down the potential EARFCNs.

Figure 19:
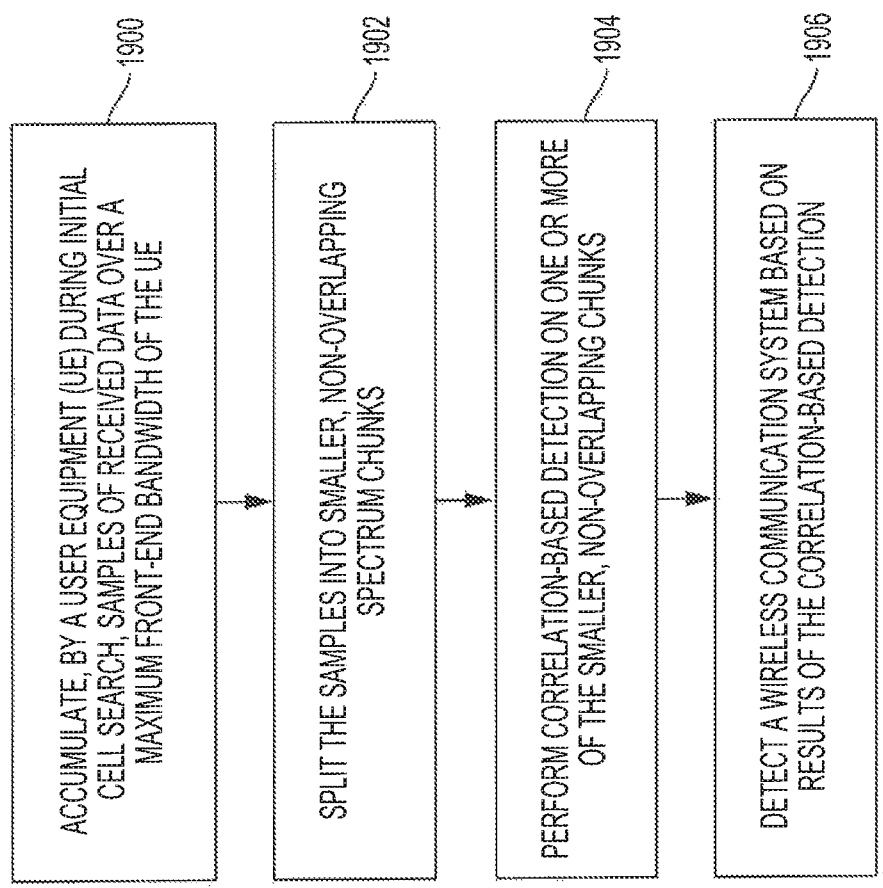
FIG. 19 is a block diagram illustrating example blocks of an initial frequency scan process according to some embodiments of the present disclosure.

Referring to FIG. 19, method of wireless communication includes may be carried out by a UE, a relay node, or another wireless communication apparatus that performs an initial frequency scan process. Beginning at block 1900, the method includes accumulating, by the UE during initial cell search, samples of received data over a maximum front-end bandwidth of the UE. Processing may proceed from block 1900 to block 1902.

At block 1902, the UE may split the samples into smaller, non-overlapping spectrum chunks. It is envisioned that block 1902 may include further splitting at least one of the smaller, non-overlapping chunks into more smaller, non-overlapping chunks. In some implementations, block 1902 may include subdividing the spectrum in a binary tree fashion having a number of levels, wherein, at each of the levels, bandwidth is divided into two halves. It is further envisioned that the subdivision of the bandwidth may achieved by performing a Hilbert transform. Additionally, block 1902 may include performing CP correlation detection on each of the smaller, non-overlapping chunks at each of the levels, and/or processing at least one of the two halves by down sampling and rotating the at least one of the two halves. Also, block 1902 may include selecting the number of levels to ensure that all smallest spectrum chucks at a lowest level have respective bandwidths that are equivalent to a minimum supported bandwidth, such as 1.4 MHz.

As an alternative or in addition to subdividing the spectrum in a binary tree fashion, block 1902 may include splitting the samples into two or more smaller, non-overlapping chunks in response to inability to make a strong decision about detection of a wireless signal in the samples. In this implementation, block 1902 may include further splitting at least one of the smaller, non-overlapping chunks into more smaller, non-overlapping chunks in response to determining an inability to make a strong decision about detection of a wireless signal in the at least one of the smaller, non-overlapping chunks. It is envisioned that determining the inability to make a strong decision about detection of the wireless signal at block 1902 may correspond to determining that z is less than a detection threshold δ, wherein z is a performance metric equal to max |Bcorr(n)| ∀n for a cyclic prefix (CP) accumulations buffer Bcorr(n).

As another alternative or in addition to subdividing the spectrum in a binary tree fashion, block 1902 may include splitting the samples into two or more smaller, non-overlapping chunks in response to detection of a wireless signal in the samples. In this implementation, block 1902 may include further splitting at least one of the smaller, non-overlapping chunks into more smaller, non-overlapping chunks in response to detection of the wireless signal in the at least one of the smaller, non-overlapping chunks. It is envisioned that detecting the presence of the wireless signal may correspond to determining that z is greater than a detection threshold δ, wherein z is a performance metric equal to max |Bcorr(n)| ∀n for a cyclic prefix (CP) accumulations buffer Bcorr(n). In this implementation, block 1902 may be performed to split the samples to exactly localize the wireless communication system of the wireless signal. Processing may proceed from block 1902 to block 1904.

At block 1904, the UE may perform correlation-based detection on one or more of the smaller, non-overlapping chunks. For the implementation that involves subdividing the spectrum in a binary tree fashion in block 1902, block 1904 may include performing correlation-based detection on each and every spectrum chunk at each level of the tree. For those implementations that involve splitting samples into chunks, at block 1902, in response to determining an inability to make a strong decision about detection of a wireless signal or in response to detection of a wireless signal, the results of the correlation base detection performed in block 1904 may be used in block 1902 to make the respective determinations. Accordingly, it is envisioned that processing may return to block 1902 in a recursive fashion until a determination is made to perform no more splitting. Processing may proceed from block 1904 to block 1906.

At block 1906, the UE may detect a wireless communication system based on results of the correlation-based detection. For example, the UE may select the chunk or bandwidth portion that exhibits the highest performance metric z, and search the EARFCNs of that chunk to find the true EARFCN of the wireless communication system. Following block 1906, the UE may perform other procedures, such as synchronization and/or access of the wireless system, as will be readily apparent to one skilled in the art.

Figure 20:
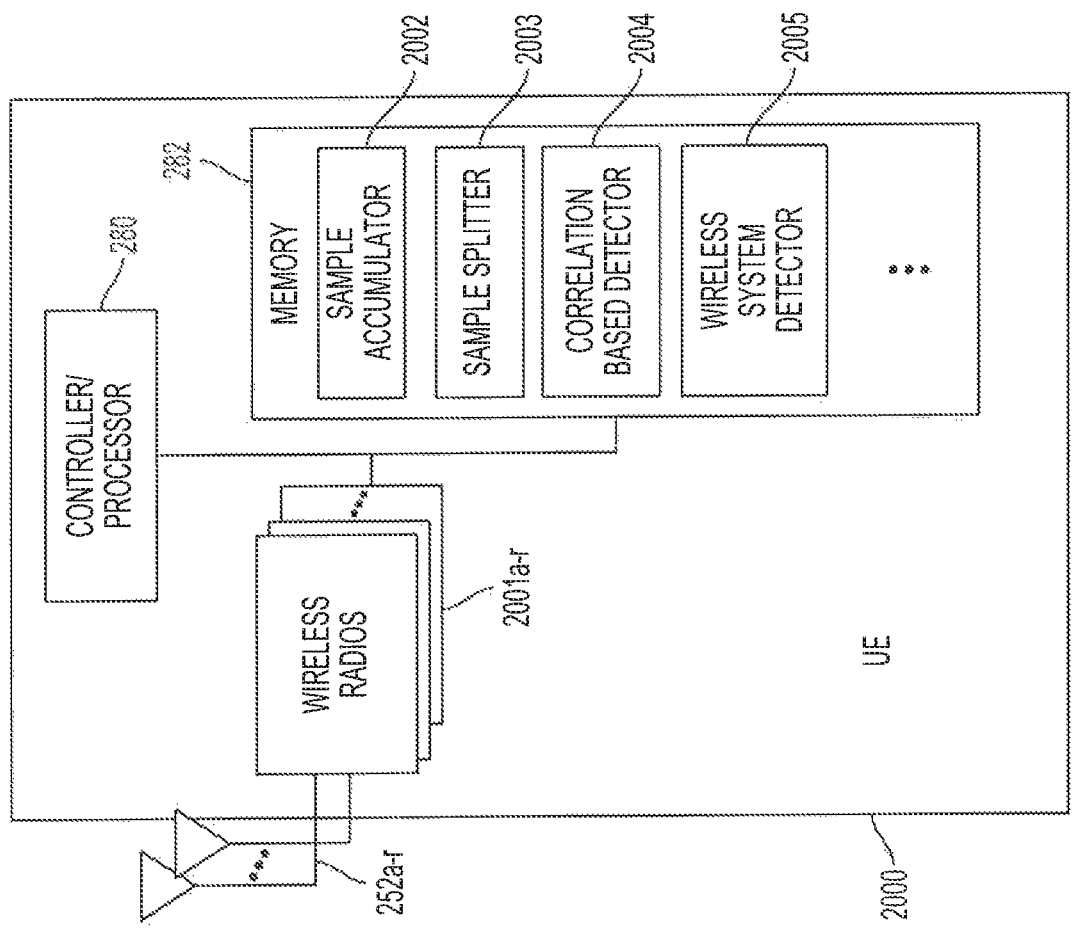
FIG. 20 is a block diagram illustrating a wireless communication apparatus according to some embodiments of the present disclosure.

Turning to FIG. 20, a UE 2000, such as a UE 115 (see FIG. 2), may have a controller/processor 280, a memory 282, and antennas 252*a* through 252*r*, as described above. UE 2000 may also have wireless radios 2001*a* to 2001*r* that comprise additional components also described above with reference to FIG. 2. The memory 282 of UE 2000 stores algorithms that configure processor/controller 280 to carry out procedures as described above in FIGS. 11-19.

Algorithms stored by memory 282 configure processor/controller 280 to carry out procedures relating to performing initial frequency scan by the UE 2000, as previously described. For example, sample accumulator 2002 configures controller processor 280 to carry out operations that include accumulating samples in a buffer over a UE front end bandwidth in any manner previously described. Additionally, sample splitter 2003 configures controller processor 280 to carry out operations that include splitting the samples into smaller, non-overlapping chunks in any manner previously described. Also, correlation-based detector 2004 configures controller processor 280 to carry out operations that include performing correlation based detection on the accumulated samples, and/or portions thereof in any manner previously described. Further, wireless system detector 2005 configures controller processor 280 to carry out operations that include detecting the wireless system based on results of the correlation-based detection in any manner previously described Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 11-20) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of performing wireless communication, the method comprising:
    accumulating, by a user equipment (UE) during initial cell search, samples of received data over a maximum front-end bandwidth of the UE;
    splitting the samples into multiple successive sets of smaller, non-overlapping spectrum chunks by subdividing the spectrum in a binary tree fashion having a number of levels, wherein, at each of the levels, bandwidth is divided into two halves, wherein the subdivision of the bandwidth is achieved by performing a Hilbert transform;
    performing correlation-based detection on one or more of the smaller, non-overlapping chunks of the multiple successive sets of smaller, non-overlapping spectrum chunks; and
    detecting a wireless communication system based on results of the correlation-based detection.

2. The method of claim 1, wherein performing correlation-based detection comprises performing cyclic prefix (CP) correlation detection on each of the smaller, non-overlapping chunks at each of the levels.

3. The method of claim 1, comprising processing at least one of the two halves by down sampling and rotating the at least one of the two halves.

4. A method of performing wireless communication, the method comprising:
    accumulating, by a user equipment (UE) during initial cell search, samples of received data over a maximum front-end bandwidth of the UE;
    splitting the samples into multiple successive sets of smaller, non-overlapping spectrum chunks by subdividing the spectrum in a binary tree fashion having a number of levels, wherein, at each of the levels, bandwidth is divided into two halves and selecting the number of levels to ensure that all smallest spectrum chunks at a lowest level have respective bandwidths that do not fall below a minimum supported bandwidth;
    performing correlation-based detection on one or more of the smaller, non-overlapping chunks of the multiple successive sets of smaller, non-overlapping spectrum chunks; and
    detecting a wireless communication system based on results of the correlation-based detection.

5. The method of claim 4, wherein the minimum supported bandwidth is 1.4 MHz.

6. A method of performing wireless communication, the method comprising:
    accumulating, by a user equipment (UE) during initial cell search, samples of received data over a maximum front-end bandwidth of the UE;
    splitting the samples into a first set of two or more smaller, non-overlapping spectrum chunks in response to determining an inability to make a strong decision about detection of a wireless signal in the samples and further splitting at least one of the first set of the smaller, non-overlapping chunks into a second set of yet smaller, non-overlapping chunks in response to determining the inability to make a strong decision about detection of a wireless signal in the at least one of the first set of the smaller, non-overlapping chunks, wherein
    determining the inability to make a strong decision about detection of the wireless signal comprises determining that z is less than a detection threshold $\delta$, wherein z is a performance metric equal to max $|Bcorr(n)| \forall n$ for a cyclic prefix (CP) accumulations buffer Bcorr(n);
    performing correlation-based detection on one or more of the first set of the smaller, non-overlapping chunks and the second set of the yet smaller, non-overlapping chunks; and
    detecting a wireless communication system based on results of the correlation-based detection.

7. A method of performing wireless communication, the method comprising:
    accumulating, by a user equipment (UE) during initial cell search, samples of received data over a maximum front-end bandwidth of the UE;
    performing correlation-based detection on the samples of received data, wherein performing the correlation-based detection on the samples of received data comprises
        splitting the samples into two or more smaller, non-overlapping chunks in response to detection of a presence of a wireless signal in the samples;
        further splitting at least one of the smaller, non-overlapping chunks into yet smaller, non-overlapping chunks in response to detection of the presence of the wireless signal in the at least one of the smaller, non-overlapping chunks, wherein
        detection of the presence of the wireless signal comprises determining that z is greater than a detection threshold $\delta$, wherein z is a performance metric equal to max $|Bcorr(n)| \forall n$ for a cyclic prefix (CP) accumulations buffer Bcorr(n); and
    detecting a wireless communication system based on results of the correlation-based detection.

8. The method of claim 7, comprising splitting the samples to exactly localize the wireless communication system of the wireless signal.

9. A wireless communications apparatus, the apparatus comprising:
    at least one computer processor; and
    at least one memory coupled to said at least one computer processor, wherein said at least one computer processor is configured to:
        accumulate, by a user equipment (UE) during initial cell search, samples of received data over a maximum front-end bandwidth of the UE;
        split the samples into multiple successive sets of smaller, non-overlapping spectrum chunks by subdividing the spectrum in a binary tree fashion having a number of levels, wherein, at each of the levels, bandwidth is divided into two halves, wherein the subdivision of the bandwidth is achieved by performing a Hilbert transform;
        perform correlation-based detection on one or more of the smaller, non-overlapping chunks of the multiple successive sets of smaller, non-overlapping spectrum chunks; and
        detect a wireless communication system based on results of the correlation-based detection.

10. The apparatus of claim 9, wherein said at least one computer processor configured to perform correlation-based detection comprises said at least one computer processor configured to perform cyclic prefix (CP) correlation detection on each of the smaller, non-overlapping chunks at each of the levels.

11. The apparatus of claim 9, wherein said at least one computer processor is configured to process at least one of the two halves by down sampling and rotating the at least one of the two halves.

12. A wireless communications apparatus, the apparatus comprising:
   at least one computer processor; and
   at least one memory coupled to said at least one computer processor, wherein said at least one computer processor is configured to:
      accumulate, by a user equipment (UE) during initial cell search, samples of received data over a maximum front-end bandwidth of the UE;
      split the samples into multiple successive sets of smaller, non-overlapping spectrum chunks by sub-dividing the spectrum in a binary tree fashion having a number of levels, wherein, at each of the levels, bandwidth is divided into two halves and select the number of levels to ensure that all smallest spectrum chunks at a lowest level have respective bandwidths that do not fall below a minimum supported bandwidth;
      perform correlation-based detection on one or more of the smaller, non-overlapping chunks of the multiple successive sets of smaller, non-overlapping spectrum chunks; and
      detect a wireless communication system based on results of the correlation-based detection.

13. The apparatus of claim 12, wherein the minimum supported bandwidth is 1.4 MHz.

14. A wireless communications apparatus, the apparatus comprising:
   at least one computer processor; and
   at least one memory coupled to said at least one computer processor, wherein said at least one computer processor is configured to:
      accumulate, by a user equipment (UE) during initial cell search, samples of received data over a maximum front-end bandwidth of the UE;
      split the samples into a first set of two or more smaller, non-overlapping spectrum chunks in response to determining an inability to make a strong decision about detection of a wireless signal in the samples and further split at least one of the first set of the smaller, non-overlapping chunks into a second set of yet smaller, non-overlapping chunks in response to determining the inability to make a strong decision about detection of a wireless signal in the at least one of the first set of the smaller, non-overlapping chunks, wherein
      determining the inability to make the strong decision comprises said at least one computer processor configured to determine the inability to make a strong decision about detection of the wireless signal by determining that z is less than a detection threshold $\delta$, wherein z is a performance metric equal to max $|Bcorr(n)| \forall n$ for a cyclic prefix (CP) accumulations buffer Bcorr(n);
      perform correlation-based detection on one or more of the first set of the smaller, non-overlapping chunks and the second set of the yet smaller, non-overlapping chunks; and
      detect a wireless communication system based on results of the correlation-based detection.

15. A wireless communications apparatus, the apparatus comprising:
   at least one computer processor; and
   at least one memory coupled to said at least one computer processor, wherein said at least one computer processor is configured to:
      accumulate, by a user equipment (UE) during initial cell search, samples of received data over a maximum front-end bandwidth of the UE;
      perform correlation-based detection on samples of the received data, wherein said at least one computer processor configured to perform the correlation-based detection of the samples of received data comprises said at least one computer processor configured to:
         split the samples into two or more smaller, non-overlapping spectrum chunks in response to detection of a presence of a wireless signal in the samples;
         further split at least one of the smaller, non-overlapping chunks into yet smaller, non-overlapping chunks in response to detection of the presence of the wireless signal in the at least one of the smaller, non-overlapping chunks, wherein
         detection of the presence of the wireless signal comprises said at least one computer processor configured to detect the presence of the wireless signal by determining that z is greater than a detection threshold $\delta$, wherein z is a performance metric equal to max $|Bcorr(n)| \forall n$ for a cyclic prefix (CP) accumulations buffer Bcorr(n); and
      detect a wireless communication system based on results of the correlation-based detection.

16. The apparatus of claim 15, wherein said at least one computer processor is configured to split the samples to exactly localize the wireless communication system of the wireless signal.

* * * * *